UNITED STATES PATENT OFFICE 2,576,293

DYESTUFFS

Harold France and Norman Hulton Haddock, Blackley, Manchester, England, assignors to Imperial Chemical Industries Limited, a corporation of Great Britain No Drawing. Application July 11, 1949, Serial No. 104,137. In Great Britain July 26, 1948

4 Claims. (Cl. 260—344.6)

This invention relates to new dyestuffs and more particularly to new wool dyestuffs of the xanthene series which are capable of being chromed.

In British Specification No. 472,757 it was proposed to manufacture dyestuffs of the xanthene series capable of being chromed by condensing 1 molecular proportion of 3- or 5-hydroxytrimellitic acid or anhydride with 2 molecular proportions of an N-substituted m-aminophenol, for example 3-hydroxydiphenylamine and to convert the products into sulphonic acids by treatment with sulphonating agents. The light fastness of such dyestuffs is enhanced by chroming and some sulphonated dyestuffs of this kind after being chromed have a light fastness as high as 4–5 on the Society of Dyers and Colourists scale.

We have now found that if as N-substituted m-aminophenols there are used 3-hydroxy-2':6'-dimethyldiphenylamines for condensing with 5-hydroxytrimellitic acid or anhydride there are obtained on sulphonating, dyestuffs which on chroming give bright red shades of light fastness of about 7 on the Society of Dyers and Colourists scale. Such a light fastness is unusually high for a dyestuff of the xanthene series.

According to our invention therefore we provide a process for the manufacture of new dyestuffs which comprises treating 3:6-di-(2:6-dimethylanilino)-4'-hydroxy-5'-carboxy-fluoran and/or 3:6-di-(2:6-dimethylanilino)-5'-hydroxy-4'-carboxy-fluoran with a sulphonating agent.

The new dyestuffs in the form of their free acids thus have the formulae:

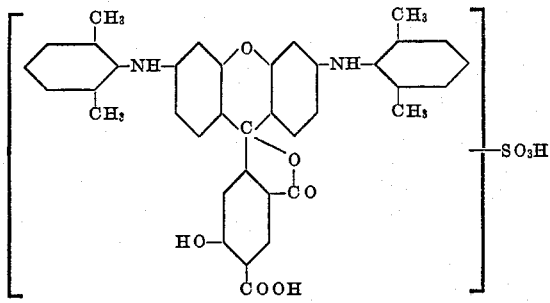

and

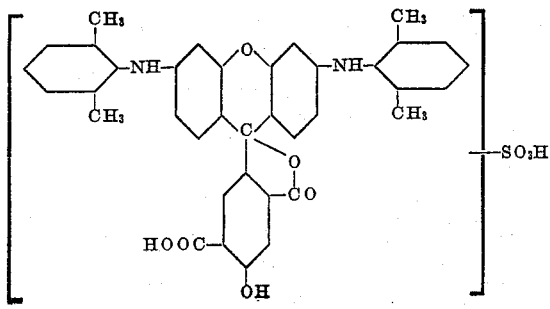

or the corresponding tautomeric quinonoid formulae. The sulphonic acid group is probably attached to the dimethylanilino nucleus.

The sulphonation may be carried out by treating the fluoran derivative with for example 100% sulphuric acid and the new dyestuff may be isolated for example by pouring the sulphonation mixture into water and filtering.

The fluoran derivative used as starting material may be made for example by (1) reacting a 2:6-dimethylaniline, for example m-2-xylidine, with m-chlorophenol or resorcinol and condensing 2 molecular proportions of the 3-hydroxy-2':6'-dimethyldiphenylamine so obtained with 1 molecular proportion of 5-hydroxytrimellitic acid to form the 3:6-di-(2:6-dimethylanilino)-4'-hydroxy-5'-carboxy-fluoran and/or the isomeric 3:6-di-(2:6-dimethylanilino)-5'-hydroxy-4'-carboxy-fluoran, or (2) by reacting 5-hydroxytrimellitic acid with 2 molecular proportions of m-chlorophenol and condensing the resulting 3:6-dichloro-4'- or 5'-hydroxy- 5'- or 4'-carboxy-fluoran with 2 molecular proportions of the 2:6-dimethylaniline, or (3) by reacting 5-hydroxytrimellitic acid with 2 molecular proportions of resorcinol to give 4'- or 5'-hydroxy- 5'- or 4'-carboxy-fluorescein which is converted to 3:6-dichloro- 4'- or 5'-hydroxy- 5' or 4'-carboxy-fluoran and the latter finally condensed with 2 molecular proportions of 2:6-dimethylaniline.

The invention is illustrated but not limited by the following example in which the parts are by weight.

Example 11.3 parts of 5-hydroxytrimellitic acid and 10.65 parts of 3-hydroxy-2':6'-dimethyldiphenylamine are heated together at 150° C. and 6.6 parts of anhydrous zinc chloride are added. The mixture is heated to 180° C. and stirred at 178–182° C. for 3½ hours. The viscous green iridescent dark red mixture so obtained is then cooled, powdered and added to a mixture of 500 parts of water and 10 parts of concentrated hydrochloric acid. The mixture is stirred and heated slowly to 80° C. and stirred at 80–85° C. for 15 minutes. The red dyestuff is filtered off, extracted again with dilute hydrochloric acid, filtered off, washed with water until free from mineral acid and dried.

5.1 parts of the above dyestuff are added during 45 minutes to 50 parts of 100% sulphuric acid at 10–12° C. and the solution is stirred at this temperature for a further 1 hour when a test portion of the solution is wholly soluble in aqueous sodium acetate solution. The sulphonation mixture is then poured onto 250 parts of crushed ice and the precipitated red dyestuff is filtered off and washed with 60 parts of 15% salt solution. The dyestuff thus obtained may be purified by dissolving it in 250 parts of water at 60° C. by the addition of sodium acetate, filtering the solution from any undissolved matter, making the solution acid by adding hydrochloric acid and then adding 30 parts of salt. The precipitated dyestuff is filtered off, washed with 60 parts of 15% salt solution and dried to a bright red powder. The new dyestuff when applied to wool and chromed gives a bright red shade of light fastness of 7 on the Society of Dyers and Colourists scale.

A similar dyestuff may also be obtained by using, in place of the 50 parts of 100% sulphuric acid at 10–12° C. for 1 hour, 100 parts of 94–96% sulphuric acid at 55–65° C. for 1 hour, or 100 parts of 90% sulphuric acid at 95–100° C. for 1 hour.

We claim:

1. The new dyestuffs which are represented by the formula—

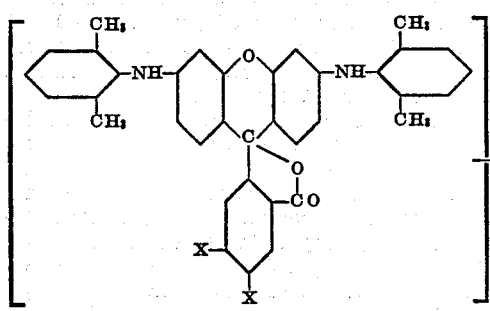

where one of the substituents marked X is a hydroxyl group and the other is a carboxyl group.

2. Process for the manufacture of new dyestuffs which comprises treating a member selected from the group consisting of 3:6-di-(2:6-dimethylanilino)-4'-hydroxy-5'-carboxy-fluoran and 3:6-di(2:6 - dimethylanilino) - 5' - hydroxy - 4' - carboxy-fluoran with a sulphonating agent.

3. The dyestuff which is represented by the formula—

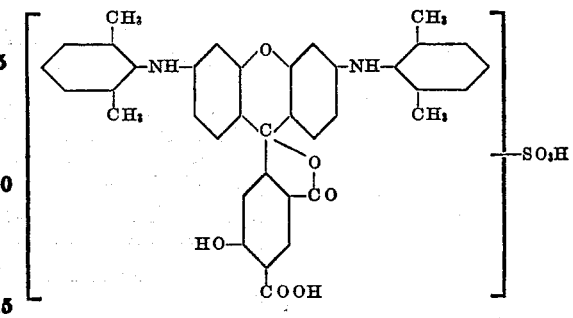

4. The dyestuff which is represented by the formula—

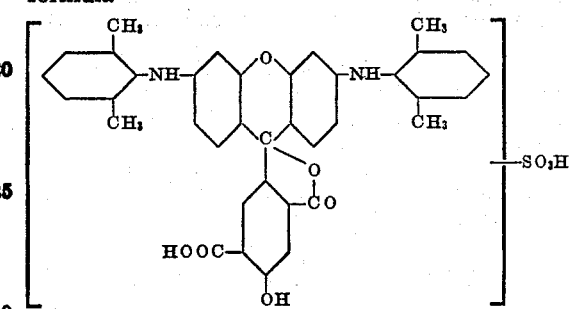

HAROLD FRANCE.
NORMAN HULTON HADDOCK.

REFERENCES CITED

The following references are of record in the file of this patent:

UNITED STATES PATENTS

| Number | Name | Date |
|---|---|---|
| 2,296,153 | Eckert | Sept. 15, 1942 |